United States Patent Office

3,006,889
Patented Oct. 31, 1961

3,006,889
POLYMERS OF VINYL CHLORIDE AND CHLO-
RINATED POLYMERS OF VINYL CHLORIDE
BLENDED WITH CHLORINATED POLYOLEFINS
Hans-Helmut Frey, Frankfurt am Main, Germany, assignor to Farbwerke Hoechst Aktiengesellschaft vormals Meister Lucius & Brüning, Frankfurt am Main, Germany, a corporation of Germany
No Drawing. Filed Dec. 27, 1956, Ser. No. 630,724
Claims priority, application Germany Jan. 3, 1956
5 Claims. (Cl. 260—45.5)

The present invention relates to a process for the improvement of plastic masses on the basis of polyvinyl chloride.

Polyvinyl chloride is widely used in many fields of application, and yet it entails various disadvantages so as to render difficult or even impossible the use of the above plastic for certain purposes. Therefore, attempts have been made to modify the properties of polyvinyl chloride.

Many experiments were made to transform hard polyvinyl chloride into a softer material. There are generally known the "external plasticizing" by means of innumerable plasticizers recommended and used in these cases, furthermore the "internal plasticizing" using the various copolymers.

Both processes involve considerable disadvantages, for example in the case of the external plasticizing the extractability and a more or less pronounced tendency of the plasticizer to travel; moreover, the thermal stability already decreases when small amounts of plasticizer are added. Also in the case of copolymers the advantage obtained by the addition of one or several mixing components often entails serious inconvenience, for example in many cases the loss of dimensional stability in the hot, so that the application of copolymers was limited to quite definite fields.

Furthermore, it was tried very early to modify polyvinyl chloride by adding high-polymeric natural and synthetic substances. The use of caoutchouc, for example, did not gain any practical importance, since the compatibility of these two high-polymeric compounds is too bad. The new synthetic caoutchouc types are, however, practically used, especially a mixture of polyvinyl chloride with nitrile caoutchouc. An inconvenience of this polymer mixture, however, is the reduction of the thermal stability and the phenomenon of aging under the action of sun and light. It should be noted that the double bond of the caoutchouc components of which a considerable proportion is used in the above mixture, is only partially saturated by vulcanization, and there is reason to believe that this double bond gives rise to the above phenomenon of aging.

Now I have found that polyvinyl chloride and the copolymers thereof can be improved by adding macromolecular halogen-containing hydrocarbons which simultaneously may contain sulfur.

As improving agents there may be mentioned for example the chlorination products of polyethylene, polypropylene and the halogenated copolymers thereof. Especially advantageous is the use of the chlorination products of the portion of ethylene-propylene copolymers which is insoluble in aliphatic hydrocarbons boiling between 80 and 220° C.

There may also be used the chlorosulfonation products of the specified macromolecular hydrocarbons.

It should be noted that macromolecular hydrocarbons used as starting material for the preparation of the improving agents can be prepared by the high-pressure, preferably by the low-pressure polymerization process and that halogen may represent fluorine, chlorine, bromine, and iodine. Naturally, there may also be used after-halogenated, preferably after-chlorinated homo- or copolymers of vinyl chloride for the improvement of homo- or copolymers of vinyl chloride; in this case it will be advantageous to use additionally also the chlorosulfonation products mentioned above. All improving agents mentioned can be used alone or in the form of mixtures.

It was not to be foreseen that the chlorination products of high molecular weight added to polyvinyl chloride or the copolymers thereof according to the invention would improve the properties of, for example, polyvinyl chloride, since the added chlorination products, especially those having average content of chlorine, represent sticky masses, which alone have neither a sufficient solidity nor a dimensional stability in the hot. It is preferable to add to the polyvinyl chloride or the copolymers thereof the chlorinated polyolefins in a proportion of between about 10 to about 50%, in which case the chlorinated polyolefins preferably contain between about 20 and about 60% of chlorine.

Only the mixture of these chlorinated high polymers with polyvinyl chloride yields a product having absolutely new properties.

It should especially be noted that an addition of a relatively large amount of chlorination products practically does not impair the good properties of polyvinyl chloride, but improves considerably the notched-bar impact strength and impact strength of the above polymer mixtures and also the resistance to cold of polyvinyl chloride. In this respect it should be mentioned that the notched-bar impact strength, impact strength and resistance to cold of polyvinyl chloride may be improved by adding a known plasticizer. But in this case most of the other properties are impaired so that the known processes involve disadvantages in industry.

It should furthermore be pointed out that in general it is desirable to increase the value of the notched-bar impact strength, impact strength and resistance to cold of plastics to avoid brittleness.

The non-combustibility, the transparency, and the non-aging of this polymer mixture are a further essential advantage over many other plastics and mixtures of plastics. Double bonds as in mixtures, for example of polyvinyl chloride with synthetic caoutchouc do not appear in the mixtures prepared according to the present invention, so that they are not subject to phenomena of aging.

The chlorine content in the chlorination products may vary within wide limits. Even in the case of a low chlorine proportion of about 20% already favorable effects, for example in the notched-bar impact strength can be observed. The above chlorination products however are not allowed to contain chlorine in a proportion exceeding considerably about 57%, i.e. the chlorine content of polyvinyl chloride, in order to bring about a strong effect.

The polyvinyl chloride may be mixed with the chlorination, chlorosulfonation products by a method known for polyvinyl chloride, for example by mixing on a roller or an extruder.

Preferably, mixing may also be performed in that the solution or suspension of the chlorination, chlorosulfonation products of polyolefins as obtained after the chlorination, is precipitated in a conventional and known manner simultaneously with polyvinyl chloride or a polyvinyl chloride suspension.

As in the case of polyvinyl chloride it is also advantageous to use in these mixtures the plasticizers known for polyvinyl chloride. Peculiar however is the good thermostability, especially of mixtures with chlorination products of low-pressure polyethylene.

It is furthermore possible, as already known for pure polyvinyl chloride, to admix plasticizers, filling agents, colors and pigments in order to obtain special effects with mixtures of this kind.

The term polyvinyl chloride as used herein means the homopolymers of vinyl chloride, it being understood that the invention is equally applicable to the copolymers of vinyl chloride, especially those which contain a preponderant proportion of vinyl chloride. There may be used for example copolymers with vinylidene chloride, acrylic acid esters, acrylic acid nitrile and maleic acid esters.

It has furthermore been found that homopolymers and copolymers of vinyl chloride can be improved by addition of chlorination products of the portion of the copolymer of ethylene and propylene which is insoluble in aliphatic hydrocarbons boiling at a temperature within the range of about 80 to about 220° C. This is the more surprising since owing to their high crystalline content the copolymers of ethylene and propylene which are insoluble in aliphatic hydrocarbons appeared less suitable as starting materials for the plasticizing of polyvinyl chloride than the rubber-like copolymer of ethylene and propylene which is soluble in aliphatic hydrocarbons.

In the preparation of, for example, copolymers of ethylene and propylene, a portion of products is obtained which is insoluble in the alphatic hydrocarbons boiling at a temperature of about 80 to about 220° C., which hydrocarbons are used in most cases as reaction medium, whereas another portion is soluble therein. The insoluble portion is subjected to chlorination and subsequently utilized in accordance with the process of the present invention.

The products obtained by the process of the invention can be worked up by molding to yield foils, sheets or structures of other shape. By the transfer molding and injection molding processes structures of any desired shape can be obtained. By extrusion molding tubes, bands, rods and profiles are obtained which may be worked up in known manner to give for example bottles.

Owing to their good electric properties the products obtained by the process of the invention can also be used for various applications in the electrical field, for example for wire coating or in the production of spools.

In view of its poor dissolving and film forming properties polyvinyl chloride has hitherto been converted by after-chlorination into a raw material adapted for use in the field of lacquers.

The advantages achieved by after-chlorination are, however, associated with disadvantages such as brittleness and poor workability so that it appeared hitherto impossible to use after-chlorinated or non-chlorinated polyvinyl chloride in the plastic field, although the increased strength and thermo-stability of after-chlorinated and non-chlorinated polyvinyl chloride suggested their use. Only fibers of after-chlorinated polyvinyl chloride which due to their high thermo-stability were of commercial interest could be produced on an industrial scale by preparing the filaments from a solution with appropriate separation of the solvent.

The above described method is, however, not suited for the preparation of more compact and larger finished articles as they are being produced by the plastic material industry in large quantities. It would therefore be of special technical interest to use the processes as they are, for example, known for polyvinyl chloride also for this class of plastics in order to make use of the good properties of after-chlorinated polyvinyl chloride.

It has furthermore been found that the above specified macromolecular halogen-containing hydrocarbons which may also contain sulphur may likewise be admixed with the same advantage to after-chlorinated polyvinyl chloride, so that it is possible to process said hydrocarbons by a method known for polyvinyl chloride.

There can also be used mixtures of the above mentioned chlorination products and such substances as are obtained by chlorosulfonation of the same class of high polymers from which the chlorination products to be used according to the invention are prepared.

It could not be foreseen that by admixing to the brittle, rigid after-chlorinated polyvinyl chloride the chlorination products of high polymeric hydrocarbons which in the hot constitute sticky masses without measurable dimensional stability (for example according to Martens) and of small strength, there would be obtained a useful combination which can be shaped on the machines used for the processing of plastics and which furthermore still possess to a large extent the good properties of after-chlorinated polyvinyl chloride, especially its high strength and thermo-stability.

The chlorinated high polymeric hydrocarbons are admixed to the after-chlorinated polyvinyl chloride preferably in a quantity of between about 10 and 50%, calculated upon the total mixture, the chlorine content of the chlorinated or chlorosulfonated high polymers advantageously ranging from about 20 to about 60%.

By mixing these chlorinated high polymers with after-chlorinated polyvinyl chloride a crude product with entirely new properties is obtained.

It should be stressed that these mixtures of polymers possess a strongly improved notched-bar impact strength, while the further good properties of after-chlorinated polyvinyl chloride are substantially maintained even at a relatively high addition of chlorination products.

It should be mentioned that the notched-bar impact strength of after-chlorinated polyvinyl chloride can also be improved by using a known plasticizer which, however, impairs most of the other properties so that in practice the known processes entail disadvantages.

The non-inflammability, transparency and non-aging of this polymer mixture constitute further essential advantages over a number of further plastic materials and mixtures thereof. Double bonds as, for example, in the mixtures of after-chlorinated polyvinyl chloride with synthetic rubber, are not present in the mixtures of the invention so that no aging resulting therefrom can take place.

By chlorination products, or chlorosulfonation products according to the invention there are understood products obtained by chlorinating or chlorosulfonating high polymeric hydrocarbons, such as polyethylene, polypropylene and their copolymers. In this respect the chlorination products and chlorosulfonation products of low pressure olefins have proved especially suitable. In many cases it is of particular advantage to use as addition substance, after the chlorination, the portion of copolymers of ethylene and propylene which is insoluble in aliphatic hydrocarbons boiling within a temperature of about 80 to about 220° C.

It is obvious to the expert and should only be mentioned in order to avoid any misunderstanding that by chlorination products of high-polymeric hydrocarbons there are to be understood here only products which have been obtained by a process yielding homogeneous products or substantially homogeneous products, i.e. in which each hydrocarbon chain contains at least one chlorine atom and in which furthermore not over-chlorinated (more than about 60% of chlorine) molecules are present in addition to completely non-chlorinated polyolefins, as may be in the case in chlorination processes operating in a heterogeneous phase.

As in the case of polyvinyl chloride it is likewise of advantage to use the stabilizers known from polyvinyl chloride in mixtures prepared on the basis of after-chlorinated polyvinyl chloride. It is furthermore possible, as is known from polyvinyl chloride, to intermix softeners, filling materials, dyestuffs, and pigments to attain a special effect with the aid of such mixtures.

It is also possible to produce foamy material.

By after-chlorinated polyvinyl chloride are here to be understood all products that have been obtained by after-chlorination of polyvinyl chloride or copolymers of polyvinyl chloride. There may be used for example, copolymers with vinyl acetate, vinylidene chloride, acrylic acid esters, acrylic acid nitrile, and maleic acid esters.

It has also been found that both the chlorination products of high polymeric hydrocarbons, for example of polyethylene and polypropylene and the copolymers thereof, and the chlorosulfonation products of high polymeric hydrocarbons, such as polyethylene or polypropylene or copolymers thereof, exhibit an effect when admixed to polyvinyl chloride or copolymers thereof, an effect which most suitably is determined by measuring the notched-bar impact strength. In practice it is often important that the dimensional thermo-stability be substantially maintained and not severely reduced as in the case of a small addition of a conventional softener.

The special advantage of the chlorosulfonation products resides in the fact that corresponding to the content of sulfochloride groups the mixture of polyvinyl chloride and chlorosulfonation products may subsequently be vulcanized by known methods.

By chlorosulfonation products of high polymeric hydrocarbons are here to be understood such products as are obtained in a known chlorosulfonation of high polymeric hydrocarbons, for example, polyethylenes, polypropylenes and the copolymers thereof. In this respect it is immaterial whether the high polymeric hydrocarbons have been obtained by a high or low pressure polymerization process.

The content of chlorine in the chlorosulfonation products may vary within wide limits. Already a proportion of about 5% has a favorable effect, for example on the notched-bar impact strength.

The content of sulphur in the chlorosulfonation products may also vary within wide limits; generally, however, it should not exceed 10%.

In admixing the above chlorosulfonation products to polyvinyl chloride and copolymers thereof, it is generally useful to use a fairly high proportion of polymers and copolymers of vinyl chloride, in order substantially to maintain the excellent properties of these thermoplasts. In practice it will seldom be desirable to add the chlorosulfonation products to the polymers in a proportion exceeding 50%, calculated upon the total mixture.

As with pure polyvinyl chloride, it is also advantageous to use in the above mixtures the stabilizers known from polyvinyl chloride.

Furthermore, it is possible, as is known from pure polyvinyl chloride, to admix plasticizers, fillers, dyes and pigments in order to attain special effects with such mixtures.

As additions according to the present invention there may be used with special advantage chlorosulfonation products of that portion of an ethylene-propylene copolymer which has preferably been prepared by a low-pressure polymerization process, which portion is insoluble in aliphatic hydrocarbons boiling between 80 and 220° C. The additions according to the invention may also be added in admixture with chlorination products containing preferably 20 to 60% of chlorine, for example chlorination products of polyethylene, polypropylene and/or their copolymers, and it is advantageous to add that portion of the ethylene-propylene copolymers which is insoluble in aliphatic hydrocarbons boiling between 80 and 220° C., the copolymers having preferably been prepared by a low pressure polymerization process. There may also be added mixtures of chlorosulfonation products of high polymeric hydrocarbons with other chlorine-containing polymers, particularly polymers and copolymers of the 2-chloro-butadiene, optionally in combination with the chlorination products of ethylene and propylene copolymers cited above. According to another variant of the present invention, the chlorosulfonation products may also be used as additions to post-chlorinated polyvinyl chloride and/or post-chlorinated copolymers of vinyl chloride.

It has further been found that homopolymers and copolymers of vinyl chloride can be improved by adding mixtures of the aforementioned improving agents; there may additionally be used further chlorine-containing polymers, particularly polymers and copolymers of 2-chlorobutadiene.

It is surprising that the individual mixed chlorination constituents have no cumulative effect but a synergistic effect inasmuch as the effect of the mixture partly excels considerably the efficacy of the individual additions; alternatively, an ineffective addition in combination with an effective addition may produce an effect in polyvinyl chloride and/or the copolymers thereof.

In order to produce an effect by the above described additions it is, however, necessary that the hydrocarbon chain be homogeneously or substantially homogeneously chlorinated; this means that each individual polymer molecule possesses chlorine atoms in its chain. It is, however, not absolutely necessary that each molecule must have the same chlorine content. Such a homogeneous chlorination is attained, for example, by chlorinating in the dissolved phase, for instance in a solvent; however, substantially homogeneous and accordingly effective chlorinated products suitable as additions may also be obtained using other processes. In the polychloroprene chain, a substantially homogeneous dispersion of the chlorine in the hydrocarbon chain is warranted by the process of its preparation, i.e. by the polymerization.

The admixture of the additions may be performed in the manner described above; it is, however, advantageous that the solutions or dispersions of the individual substances to be mixed be worked up together.

In many cases it is especially advantageous to use as additions chlorination products of that portion of the ethylene-propylene copolymers which is insoluble in aliphatic hydrocarbons boiling between 80 and 220° C., the copolymer having preferably been obtained by a low pressure polymerization process.

The following examples serve to illustrate the invention, but they are not intended to limit it thereto, the parts being by weight unless otherwise stated:

EXAMPLE 1

A polyvinyl chloride having a K-value of about 70 and subsequently a mixture consisting of 90% of polyvinyl chloride and of 10% of chlorinated low pressure polyethylene containing 30% of chlorine are treated on a mixing roller for 10 minutes at a temperature of 160° C. while 2% of a thin stabilizer is added.

The rolled sheets are pressed to obtain sheets of 4 mm. and 2 mm. thickness with the following values:

|  | Dimension | Pure PVC | The same PVC with admixture of 10% chlorinated polyethylene (30% of Cl) |
|---|---|---|---|
| Tensile strength | Kg./cm.$^2$ | 670 | 490. |
| Elongation | Percent | 19 | 33. |
| Impact strength | Cm.×kg./cm.$^2$ | Without breaking. | Without breaking. |
| Notched-bar impact strength. | Cm.×kg./cm.$^2$ | 3 | 13.5. |
| Flexural strength | Kg./cm.$^2$ | 910 | 700. |
| Deflection | Mm. | 4.9 | 4.8. |
| Ball pressure hardness | Kg./cm.$^2$ | 1,095/1,030 | 830/793. |
| Shore hardness D | Without dimension. | 82 | 73. |
| Heat distortion temperature ° C. (according to Martens). | ° C. | 69 | 63. |

EXAMPLE 2

When in Example 1 the chlorinated low pressure polyethylene containing 30% of chlorine is replaced by a low pressure polyethylene containing 38% of chlorine and when there is operated under otherwise the same conditions as described in Example 1 the following values are obtained:

| | Dimension | The same PVC as in Example 1 with admixture of 10% of chlorinated polyethylene (Cl=38%) |
|---|---|---|
| Tensile strength | kg./cm.² | 511. |
| Elongation | Percent | 31. |
| Impact strength | Cm.×kg./cm.² | Without breaking. |
| Notched-bar impact strength | Cm.×kg./cm.² | 14. |
| Flexural strength | Kg./cm.² | 749. |
| Deflection | Mm | 4.7. |
| Ball pressure hardness 10'/60' | Kg./cm.² | 822/739. |
| Shore hardness D | Without dimension | 72. |
| Heat distortion temperature (according to Martens). | °C | 62. |

EXAMPLE 3

When as described in Example 1 polyvinyl chloride is rolled together with a chlorinated low pressure polyethylene containing (1) 24%, (2) 49% and (3) 56% of chlorine, the following values can be measured in sheets and foils. These values are compared with those obtained when using the same polyvinyl chloride to which had, however, been added the usual softener of dioctyl phthalate (DOP).

The rolled sheets are pressed to obtain sheets of 4 mm. and 2 mm. thickness with the following values:

| | Dimension | Pure PVC | The same PVC mixed with 10% of the chlorinated copolymer of ethylene and propylene (38% of chlorine) |
|---|---|---|---|
| Tensile strength | Kg./cm.² | 670 | 455. |
| Elongation | Percent | 19 | 19. |
| Impact strength | Cm.×kg./cm.³ | Without breaking. | Without breaking. Do. |
| Notched-bar impact strength | Cm.×kg./cm.² | 3 | |
| Flexural strength | Kg./cm.² | 910 | 650. |
| Deflection | Mm | 4.9 | 5. |
| Ball pressure hardness 10'/60' | Kg./cm.² | 1,095/1,030 | 768/735. |
| Shore hardness D | Without dimension. | 82 | 78. |
| Heat distortion temperature (according to Martens). | °C | 69 | 60. |

When a polyethylene that has likewise been obtained by low pressure polymerization and chlorinated until it contains up to 38% of chlorine is used in a mixture that consists of 70 parts of the same polyvinyl chloride and 30 parts of chloropolyethylene (38% of chlorine) a notched-bar impact strength of 18 kg./cm.² is obtained. It is only when a low pressure polyethylene chlorinated until it con-

| | Dimension | With 10% of DOP | With 20% of chlorinated polyethylene (Cl=24%) | With 10% of chlorinated polyethylene (Cl=49%) | With 20% of chlorinated polyethylene (Cl=49%) | With 10% of chlorinated polyethylene (Cl=56%) | With 20% of chlorinated polyethylene (Cl=56%) |
|---|---|---|---|---|---|---|---|
| Tensile strength | Kg./cm.² | 590 | 278 | 517 | 387 | 638 | 628. |
| Elongation | Percent | 25 | 14 | 23 | 51 | 12 | 26. |
| Impact strength | Cm.×kg./cm.² | 60 | Without breaking. | Without breaking. | Without breaking. | Without breaking. | Without breaking. |
| Notched-bar impact strength | Cm.×kg./cm.² | 2.8 | 8.8 | 6 | 26 | 3 | 4.2. |
| Flexural strength | Kg./cm.² | 912 | 495 | 834 | 672 | 1,002 | 1,020. |
| Deflection | Mm | 4.8 | 4.5 | 4.6 | 4.9 | 4.5 | 4.8. |
| Ball pressure hardness 10'/60' | Kg./cm.² | 782/746 | 558/530 | 854/814 | 670/657 | 965/952 | 906/953. |
| Shore hardness D | Without dimension. | 74 | 68 | 80 | 78 | 82 | 81. |
| Heat distortion temperature (according to Martens). | °C | 42 | 60 | 61 | 62 | 65 | 55. |

When e.g. the above mentioned mixture is treated with a chlorinated low pressure polyethylene of 20% (Cl=49%) on a warm extrusion press so as to obtain tubes, it is noticed after having turned off and cleaned the press that the mixture does not contain any burnt portions which usually appear when the same polyvinyl chloride is used without addition of chlorinated polyethylene. When the tube made of this mixture is treated on the roll for 10 minutes at a temperature of 160° C. without admixture of stabilizers and when the rolled sheets are granulated another tube can be extruded from this granulated mass and there will not be noticed any phenomena of decomposition which, after such strong stress of the material, always appear when only pure polyvinyl chloride without admixture of chlorinated polyethylene has been used.

EXAMPLE 4

A polyvinyl chloride having a K-value of about 70 and subsequently a mixture consisting of 90% of polyvinyl chloride having a K-value of 70 and 10% of a chlorination product of a copolymer of ethylene and propylene (about 90% of ethylene) insoluble in aliphatic hydrocarbons (boiling point: 220° C.) and obtained by a low pressure polymerization process and containing 38% of chlorine are treated on a mixing roller for 10 minutes at a temperature of 160° C. while 2% of a tin stabilizer is added.

tains 49% of chlorine is used that a mixture consisting of 70 parts of the same polyvinyl chloride and 30 parts of chloro-polyethylene (49% of chlorine) yields the same result as is the case when the chlorinated copolymer of ethylene and propylene according to the invention is used, the result being that the comparatively hard material does not break when it is subjected to the notched-bar impact strength test.

EXAMPLE 5

An after-chlorinated polyvinyl chloride containing 63.4% of chlorine and having a K-value of 69 and subsequently a mixture consisting of 90% of the same after-chlorinated polyvinyl chloride and 10% of a chlorinated low pressure polyethylene containing 40% of chlorine and a mixture consisting of 80% of the above mentioned after-chlorinated polyvinyl chloride and 20% of the above-mentioned chlorinated low pressure polyethylene are treated on a mixing roller for 10 minutes at a temperature of 170° C., while 2% of a tin stabilizer is added.

When using the pure after-chlorinated polyvinyl chloride it is almost impossible to obtain a coherent rolled sheet, whereas the mixture consisting of after-chlorinated polyvinyl chloride and chlorinated polyethylene yields a smooth rolled sheet, especially when the parts of the mixture are in the proportion of 80:20.

The pressed sheets of 4 mm. thickness had the values given below. Owing to the difficulties in manufacturing the sheets, the pure after-chlorinated polyvinyl chloride could only be tested with regard to notched-bar impact strength so that the values had to be quoted from literature.

|  | Pure after-chlorinated polyvinyl chloride | The same after-chlorinated polyvinyl chloride with 10% of chlorinated low pressure polyethylene added thereto. Cl=40% | The same after-chlorinated polyvinyl chloride with 20% of chlorinated low pressure polyethylene added thereto. Cl=40% |
|---|---|---|---|
| Notched-bar impact strength in cm. kg./cm.² | 1.6 | 5.1 | 13.5 |
| Tensile strength in kg./cm.² | 650–750 (literature). | 610 | 460 |
| Elongation in percent | 4–5 (literature). | 28 | 40 |
| Heat distortion temperature according to Martens. | °C | 71 | 70 |
| According to Vicat | | 114 | 110 |
| Shore hardness D | | 79 | 75 |

EXAMPLE 6

When as in Example 5 various pure, after-chlorinated polyvinyl chlorides that differ in their content of chlorine and in their K-values and separately 80% of these after-chlorinated polyvinyl chlorides and 20% of a chlorinated low pressure polyethylene containing 41.3% of chlorine are mixed on a mixing roller, a 4 mm. thick sheet will have the following values with regard to the notched-bar impact strength (in cm. kg./cm.²).

*Notched-bar impact strength in cm. kg./cm.²*

| Content of chlorine and K-value of the pure after-chlorinated polyvinyl chloride | | Pure after-chlorinated polyvinyl chloride | The same after-chlorinated polyvinyl chloride with 20% of chlorinated low pressure polyethylene |
|---|---|---|---|
| 63.4 | 69 | 1.6 | 11.6 |
| 62 | 62 | 2.4 | 29 |
| 62.2 | 61 | ---- | 9 |
| 64 | 63 | 1.2 | 30 |

EXAMPLE 7

When as in Example 5 an after-chlorinated polyvinyl chloride containing 64% of chlorine and having a K-value of 63 and subsequently a mixture consisting of 70% of the same after-chlorinated polyvinyl chloride and 30% of a chlorinated low pressure polyethylene containing 43.7% of chlorine are mixed on a mixing roller the following values are found:

|  | Pure after-chlorinated polyvinyl chloride | The same after-chlorinated polyvinyl chloride with 30% of chlorinated low pressure polyethylene (Cl=43.7%) |
|---|---|---|
| Notched-bar impact strength in cm. kg./cm.² | 1.2 | Without breaking. |
| Shore hardness D | 81 | 71. |
| Ball pressure hardness after 15″ and 60″. | 1,082/1,050 | 670/620. |
| Heat distortion temperature according to Martens. | | 55° C. |

In this case, too, the smooth and quiet way in which the sheet obtained from the 70/30 mixture passes the roller is especially remarkable. This is contrary to the course of the pure after-chlorinated polyvinyl chloride that does not yield a uniform sheet.

Furthermore, the high notched-bar impact strength of the 70/30 mixture ("without breaking") is remarkable, though the material is comparatively hard and shows a good resistance to heat.

EXAMPLE 8

When as in Example 5 an after-chlorinated polyvinyl chloride containing 64% of chlorine and having a K-value of 63 and subsequently a mixture consisting of 80% of the same after-chlorinated polyvinyl chloride, 10% of a chlorinated low pressure polyethylene containing 43.7% of chlorine and 10% of a chlorinated low pressure polyethylene containing 32.8% of chlorine are mixed on a mixing roller the following values are obtained:

|  | Pure after-chlorinated polyvinyl chloride | The same after-chlorinated polyvinyl chloride with 10% of chlorinated low pressure polyethylene (Cl=43.7%) and 10% of chlorinated low pressure polyethylene (Cl=32.8%) |
|---|---|---|
| Notched-bar impact strength in cm. kg./cm.² | 1.2 | 27 |
| Tensile strength in kg./cm.² | | 530 |
| Tensile elongation in percent | | 20 |
| Heat distortion temperature according to Martens, °C | | 59 |
| Ball pressure hardness after 15″ and 60″ | | 950/890 |
| Shore hardness D | | 79 |

EXAMPLE 9

When as in Example 5 an after-chlorinated polyvinyl chloride containing 64% of chlorine and having a K-value of 63 and subsequently a mixture consisting of 80% of the same after-chlorinated polyvinyl chloride and 10% of a chlorinated low pressure polyethylene containing 43.7% of chlorine and 10% of a chlorosulfonated high pressure polyethylene containing 25% of chlorine and 1.5% of sulphur are mixed on a mixing roller, the following values are found:

|  | Pure after-chlorinated polyvinyl chloride | The same after-chlorinated polyvinyl chloride with 10% of chlorinated low pressure polyethylene (Cl=43.7%) and 10% of chlorosulfonated high pressure polyethylene (Cl=25%, S=1.5%) |
|---|---|---|
| Notched-bar impact strength in cm. kg./cm.² | 1.2 | 11.6 |
| Tensile strength in kg./cm.² | | 510 |
| Tensile elongation, percent | | 30 |
| Heat distortion temperature according to Martens, °C | | 60 |
| Ball pressure hardness after 15″ and 60″ | | 905/850 |
| Shore hardness D | | 77 |

EXAMPLE 10

A polyvinyl chloride having a K-value of about 70 and separately a mixture consisting of 90% of the same polyvinyl chloride and 10% of the chlorosulfonation product of a polyethylene obtained by a low pressure polymerization and containing about 25% of chlorine and about 1.5% of sulphur are mixed on a mixing roller for 10 minutes at a temperature of 160° C., while 2% of a tin stabilizer is added.

The rolled sheets are pressed into 4 mm. thick sheets having the following values:

|  | Notched-bar impact strength | Heat distortion temperature (° C.) according to— | |
|---|---|---|---|
|  |  | Martens | Vicat |
| Pure polyvinyl chloride | 3 | 67 | 95 |
| The same polyvinyl chloride with 10% of a chlorosulfonation product of a low pressure polyethylene (Cl=25%, S=1.5%) | 10.4 | 64 | 92 |

EXAMPLE 11

When as in Example 10 a polyvinyl chloride having a K-value of 70 and separately 90% of this polyvinyl chloride together with 10% of the chlorosulfonation product of a polyethylene obtained by a high pressure polymerization and containing about 25% of chlorine and about 1.5% of sulphur are mixed, the pressed sheets will have the following values:

|  | Notched-bar impact strength | Heat distortion temperature (° C.) according to— | |
|---|---|---|---|
|  |  | Martens | Vicat |
| Pure polyvinyl chloride | 3 | 67 | 95 |
| The same polyvinyl chloride with 10% of the chlorosulfonation product of a high pressure polyethylene (Cl=25%, S=1.5%) | 9 | 63 | 92 |

EXAMPLE 12

When as in Example 10 an after-chlorinated polyvinyl chloride containing 64% of chlorine and having a K-value of 63 and subsequently a mixture consisting of 80% of the same after-chlorinated polyvinyl chloride and 20% of the chlorosulfonation product of a polyethylene obtained by a high pressure polymerization and containing about 25% of chlorine and about 1.5% of sulphur are mixed on a roller for 10 minutes at a temperature of 170° C., while 2% of a tin stabilizer is added, the following values will be found:

|  | Pure after-chlorinated polyvinyl chloride | The same after-chlorinated polyvinyl chloride with 20% of a chlorosulfonation high pressure polyethylene (Cl=25%, S=1.5%) |
|---|---|---|
| Notched-bar impact strength (cm. kg./cm.$^2$) | 1.2 | 31 |
| Tensile strength (kg./cm.$^2$) |  | 440 |
| Tensile elongation in percent |  | 20 |
| Heat distortion temperature according to Martens, ° C |  | 62 |
| Ball pressure hardness after 15″ and 60″ |  | 770/725 |
| Shore hardness D |  | 76 |

EXAMPLE 13

A polyvinyl chloride with a K-value of about 70 and separately a mixture consisting of 90 parts of this polyvinyl chloride and 10 parts of a chlorinated low pressure polyethylene (chlorine content: 49%), furthermore a mixture consisting of 90 parts of the above mentioned polyvinyl chloride and 10 parts of a chlorinated low pressure polyethylene (chlorine content: 52%), a mixture consisting of 80 parts of the above polyvinyl chloride and 20 parts of a chlorinated low pressure polyethylene (chlorine content: 52%) and a ternary mixture consisting of 80 parts of the above polyvinyl chloride and 10 parts each of the above mentioned low pressure polyethylenes (chlorine content: 49% and 52%) are mixed on a mixing roller for 15 minutes at a rolling temperature of 170° C. while in each case 2% of a tin stabilizer is added. The rolled sheets are pressed to form 4 mm. thick sheets. The following values for the notched-bar impact strength of the above sheets were found:

Pure polyvinyl chloride _____ 3
The same polyvinyl chloride with 10% of chlorinated
  low pressure polyethylene (49% of chlorine) _____ 6
The same polyvinyl chloride with 10% of chlorinated
  low pressure polyethylene (52% of chlorine) _____ 4
The same polyvinyl chloride with 20% of chlorinated
  low pressure polyethylene (52% of chlorine) _____ 5
The same polyvinyl chloride with 10% of chlorinated
  low pressure polyethylene (49% of chlorine) and
  10% of chlorinated low pressure polyethylene
  (52% of chlorine) _____ 16

Though the chlorinated low pressure polyethylene containing 52% of chlorine owing to its high content of chlorine hardly seems to have any action on polyvinyl chloride, the notched-bar impact strength can be increased ot 16 cm. kg./cm.$^2$ when the active, chlorinated polyethylene containing 49% of chlorine is admixed.

EXAMPLE 14

When as in Example 13 the same polyvinyl chloride is mixed first with chlorinated low pressure polyethylene containing 40% of chlorine and then with chlorinated low pressure polyethylene containing 52% of chlorine and when finally the polyvinyl chloride is mixed with the two chlorinated low pressure polyethylenes the following values for the notched-bar impact strength (in cm. kg./cm.$^2$) are found:

Pure polyvinyl chloride _____ 3
The same polyvinyl chloride with 10% of chlorinated low pressure polyethylene (40% of chlorine) _____ 16–24
The same polyvinyl chloride with 10% of chlorinated low pressure polyethylene (52% of chlorine) _____ 4
The same polyvinyl chloride with 20% of chlorinated low pressure polyethylene (52% of chlorine) _____ 5
The same polyvinyl chloride with 10% of chlorinated low pressure polyethylene (40% of chlorine) and 10% of chlorinated low pressure polyethylene (52% of chlorine) _____ 47

EXAMPLE 15

When according to Example 13 polyvinyl chloride is mixed with chlorinated low pressure polyethylene that in the first case contains 40% of chlorine and in the second case 49% of chlorine, the following values for the notched-bar impact strength (in cm. kg./cm.$^2$) will be obtained:

Pure polyvinyl chloride _____ 3.
The same polyvinyl chloride with
  10% of chlorinated low pressure
  polyethylene (40% of chlorine) ___ 16–24.
The same polyvinyl chloride with
  20% of chlorinated low pressure
  polyethylene (40% of chlorine) ___ 14–27.
The same polyvinyl chloride with
  10% of chlorinated low pressure
  polyethylene (49% of chlorine) ___ 6.
The same polyvinyl chloride with
  20% of chlorinated low pressure
  polyethylene (49% of chlorine) ___ 20–26.
The same polyvinyl chloride with
  10% of chlorinated low pressure
  polyethylene (40% of chlorine) and
  10% of chlorinated low pressure
  polyethylene (49% of chlorine) ___ without breaking.

EXAMPLE 16

When as in Example 13 polyvinyl chloride is mixed with chlorinated polyethylene (the polyethylene having been obtained partly by a low pressure and partly by a high pressure polymerization) the following values for the notched-bar impact strength (in cm. kg./cm.$^2$) are obtained:

| | |
|---|---|
| Pure polyvinyl chloride | 3 |
| The same polyvinyl chloride mixed with 10% of chlorinated low pressure polyethylene containing 52% of chlorine | 4 |
| The same polyvinyl chloride mixed with 20% of chlorinated low pressure polyethylene containing 52% of chlorine | 5 |
| The same polyvinyl chloride mixed with 10% of chlorinated high pressure polyethylene containing 24% of chlorine | 4 |
| The same polyvinyl chloride mixed with 10% of chlorinated low pressure polyethylene containing 52% of chlorine and 10% of chlorinated high pressure polyethylene containing 24% of chlorine | 45 |

EXAMPLE 17

When as in Example 13 polyvinyl chloride is mixed with chlorinated polyethylene and polychloroprene the following values for the notched-bar impact strength (in cm. kg./cm.$^2$) are obtained:

| | |
|---|---|
| Pure polyvinyl chloride | 3. |
| The same polyvinylchloride mixed with 10% of chlorinated low pressure polyethylene containing 30% of chlorine | 13. |
| The same polyvinyl chloride mixed with 20% of chlorinated low pressure polyethylene containing 30% of chlorine | 21. |
| The same polyvinyl chloride mixed with 10% of polychloroprene | 11. |
| The same polyvinyl chloride mixed with 20% of polychloroprene | 10. |
| The same polyvinyl chloride mixed with 10% of chlorinated low pressure polyethylene containing 30% of chlorine and with 10% of polychloroprene | without breaking. |

EXAMPLE 18

When as in Example 13 polyvinyl chloride is mixed with chlorinated polyethylene and a polychloroprene provided with an antioxidant, the following values for the notched-bar impact strength (in cm. kg./cm.$^2$) are obtained:

| | |
|---|---|
| Pure polyvinyl chloride | 3. |
| The same polyvinyl chloride mixed with 10% of chlorinated low pressure polyethylene containing 49% of chlorine | 6. |
| The same polyvinyl chloride mixed with 20% of chlorinated low pressure polyethylene containing 49% of chlorine | 20–26. |
| The same polyvinyl chloride mixed with 10% of polychloroprene | 14. |
| The same polyvinyl chloride mixed with 20% of polychloroprene | 7. |
| The same polyvinyl chloride mixed with 10% of chlorinated low pressure polyethylene containing 49% of chlorine and with 10% of polychloroprene | without breaking. |

EXAMPLE 19

When as described in Example 1, 90 or 80 parts of a suspension PVC having a K-value of 70 and 10 or 20 parts of a chlorination product of the portion which is soluble in hydrocarbons having a boiling range of 80–220° C. of a copolymer containing 90% of ethylene and 10% of propylene (Cl=40%) and having been prepared by a low pressure process, are mixed on a roller with the addition of 2% of tin stabilizer in each case, the following values are obtained:

| | Notch-bar impact strength cm. kg./cm.$^2$ |
|---|---|
| 90 parts of PVC and 10 parts of a chlorinated copolymer (Cl=40%) (ethylene/propylene 90/10) soluble in hydrocarbons boiling between 200 and 220° C | 9.3 |
| 80 parts of PVC and 20 parts of chlorinated copolymer | 14.2 |

EXAMPLE 20

When a vinyl chloride-vinyl acetate copolymer (87/13) having a K-value of 50 alone and subsequently a mixture consisting of 80 parts of the same copolymer and 20 parts of a chlorinated low-pressure polyethylene (Cl=40%) are rolled on the roller at 140° C. for 10 minutes the following values are obtained:

| | Notched-bar impact strength cm. kg./cm.$^2$ |
|---|---|
| Pure copolymer | 3.5 |
| 80% of the same copolymer with the admixture of 20% of chlorinated polyethylene (Cl=40%) | 9.7 |

EXAMPLE 21

When a solution of chlorinated polyethylene prepared by a low-pressure polymerization process (Cl=43%) and a suspension PVC having a K-value of 70 are worked up together in a manner that the powder obtained consists of 80% of PVC and 20% of the chlorinated polyethylene, subsequent to rolling this mixture at 170° C. for 10 minutes, the following values are obtained:

| | |
|---|---|
| Notched-bar impact strength at 20° C. (cm. kg./cm.$^2$) | without breaking. |
| Notches-bar impact strength at 0° C. (cm. kg./cm.$^2$) | without breaking. |

EXAMPLE 22

When, as described in Example 21, a solution of chlorinated low-pressure polyethylene (Cl=41%) is worked up with PVC in a manner that a mixture consisting of 65% of PVC and 35% of chlorinated polyethylene is obtained, subsequent to rolling this powder mixture with the addition of 2% of tin stabilizer, the following values are obtained:

| | |
|---|---|
| Impact strength (cm. kg./cm.$^2$) | without breaking. |
| Tensile strength (kg./cm.$^2$) | 260. |
| Elongation, percent | 80. |
| Flexural strength (kg./cm.$^2$) | 340. |
| Deflection (mm.) | 4.4. |
| Ball pressure hardness (15″ and 60″) (kg./cm.$^2$) | 550/510. |
| Shore hardness D | 71. |

EXAMPLE 23

When 50 parts of a suspension PVC having a K-value of 70 and 50 parts of a chlorinated polyethylene prepared by a low pressure polymerization process are rolled with the addition of 2% of tin stabilizer at 160° C. for 10 minutes on a press sheet the following values are obtained:

| | |
|---|---|
| Notched-bar impact strength (cm. kg./cm.$^2$) | without breaking. |
| Impact strength (cm. kg./cm.$^2$) | without breaking. |
| Tensile strength (kg./cm.$^2$) | 232. |
| Tensile elongation, percent | 200. |
| Flexural strength (kg./cm.$^2$) | 164. |
| Deflection (mm.) | 4.9. |
| Ball pressure hardness (kg./cm.$^2$) after 15″ and 60″ | 264/212. |
| Shore hardness D | 67. |
| Heat distortion temperature according to Vicat | 44° C. |

EXAMPLE 24

When 30 parts of PVC and 70 parts of chlorinated low pressure polyethylene (Cl=46.5%) are rolled on a roller with the addition of 2% of a tin stabilizer at 160° C. for 10 minutes the following values of the foils are obtained:

| | |
|---|---|
| Tensile strength (kg./cm.$^2$) | 120 |
| Tensile elongation, percent | 510 |
| 100% modulus (kg./cm.$^2$) | 40 |
| Shore hardness A | 84 |
| Shore hardness D | 40 |

I claim:

1. A composition of matter comprising (1) a member selected from the group consisting of polyvinyl chloride, chlorinated polyvinyl chloride, a copolymer of vinyl chloride with a vinyl monomer copolymerizable therewith, and a chlorinated copolymer of vinyl chloride and a vinyl monomer copolymerizable therewith, and (2) about 10–70% by weight of the composition of a product prepared by chlorinating in a homogeneous system a macromolecular polymer of a monoolefin of 2 to 3 carbon atoms, said product containing about 20–60% by weight of chlorine.

2. A composition of matter comprising polyvinyl chloride and about 10–70% by weight, based on the weight of the composition, of chlorinated polyethylene, the latter having a chlorine contained of 20–60% by weight and being prepared by the chlorination of the polyethylene in a homogeneous system.

3. A composition of matter comprising after-chlorinated polyvinyl chloride and about 10–70% by weight, based on the weight of the composition, of chlorinated polyethylene, the latter having a chlorine content of 20–60% by weight and being prepared by the chlorination of the polyethylene in a homogeneous system.

4. A composition of matter comprising (1) a copolymer of vinyl chloride with a vinyl monomer copolymerizable therewith, the major constituent of said copolymer being vinyl chloride, and (2) about 10–70% by weight of the composition of chlorinated polyethylene, the latter having a chlorine content of 20–60% by weight and being prepared by the chlorination of polyethylene in a homogeneous system.

5. A composition of matter comprising polyvinyl chloride and from about 10–70% by weight of the composition of a chlorinated ethylene-propylene copolymer having a chlorine content of about 20–60% by weight, said copolymer being insoluble in an aliphatic hydrocarbon having a boiling point of from about 80–220° C.

References Cited in the file of this patent

UNITED STATES PATENTS

| | | |
|---|---|---|
| 2,230,000 | Hauffe et al. | Jan. 28, 1941 |
| 2,586,363 | McAlevy | Feb. 19, 1952 |
| 2,592,763 | Taylor | Apr. 15, 1952 |
| 2,695,899 | Becker et al. | Nov. 30, 1954 |
| 2,779,754 | Erchak | Jan. 29, 1957 |
| 2,956,980 | Law | Oct. 18, 1960 |

FOREIGN PATENTS

| | | |
|---|---|---|
| 785,172 | Great Britain | Oct. 23, 1957 |